United States Patent [19]

Alford

[11] Patent Number: 4,528,238

[45] Date of Patent: Jul. 9, 1985

[54] PRODUCTION OF FIBRE-REINFORCED CEMENTITIOUS COMPOSITION

[75] Inventor: Neil M. Alford, Chester, England

[73] Assignee: Imperial Chemical Industries PLC, London, England

[21] Appl. No.: 567,346

[22] Filed: Dec. 30, 1983

[30] Foreign Application Priority Data

Jan. 19, 1983 [GB] United Kingdom ................ 8301450

[51] Int. Cl.$^3$ ........................ B32B 13/02; B32B 13/14
[52] U.S. Cl. ..................................... 428/246; 156/42; 156/288; 156/306.6; 264/324; 428/284; 428/289; 428/446; 428/703
[58] Field of Search ............... 428/703, 246, 284, 285, 428/286, 289, 446; 156/42, 288, 306.6; 264/324

[56] References Cited

U.S. PATENT DOCUMENTS

| 4,159,361 | 6/1979 | Schupack | 428/703 |
| 4,312,904 | 6/1982 | Meyer | 428/703 |
| 4,344,804 | 8/1982 | Bijen et al. | 428/703 |
| 4,344,910 | 8/1982 | Bijen et al. | 428/703 |
| 4,353,748 | 10/1982 | Birchall et al. | 106/89 |
| 4,378,401 | 3/1983 | Wright | 428/703 |
| 4,410,366 | 10/1983 | Birchall et al. | 106/90 |

OTHER PUBLICATIONS

Kirk–Othmer, *Encyclopedia of Chemical Technology*, vol. 5, pp. 163–193, *Interscience* 1972.
Encyclopedia of Chemical Technology, by Raymond E. Kirk, vol. 2, pp. 142–150, published 1948.

*Primary Examiner*—William J. Van Balen
*Attorney, Agent, or Firm*—Cushman, Darby & Cushman

[57] ABSTRACT

A process for the production of a moldable fibre-containing cementitious composition in which at least one mat of a water-insoluble fibrous material is contacted with at least one surface of a shaped article of a moldable cementitious composition, the cementitious composition comprising a homogeneous mixture of at least one hydraulic cement, water in a proportion of not more than 25% by weight of the hydraulic cement in the composition, and at least one water-soluble or water-dispersible polymeric material in a proportion of at least 1% by weight of the hydraulic cement in the composition.

The moldable cementitious composition may be in the form of a sheet and in the process two or more sheets may be used with a fibrous mat being sandwiched between adjacent pairs of sheets of cementitious composition.

Also a moldable fibre-containing cementitious composition and fibre-reinforced cement product produced by curing of the composition.

33 Claims, No Drawings

PRODUCTION OF FIBRE-REINFORCED CEMENTITIOUS COMPOSITION

This invention relates to production of a mouldable fibre-containing cementitious composition, to a fibre-containing cementitious composition, and to a fibre-reinforced cement product produced therefrom.

Fibre-reinforced cement products have been produced for many years on a very large scale. Thus, asbestos-cement sheet products have found a wide range of applications in the building industry owing to the fact that they are fire-proof and have a high degree of weather resistance.

Asbestos-cement sheet products may be produced by a variety of processes. For example, the dry ingredients, that is asbestos and cement powder, may be mixed with an amount of water sufficient to form a low viscosity slurry which is then run into the mould of a hydraulic press where it is consolidated into a dense hard sheet by filtering out the excess water under high pressure. The sheet thus produced is then allowed to cure. In an alternative process the slurry may be formed into a sheet by a process similar to the process used in paper-making. Asbestos-cement sheets may also be produced by a process in which the dry ingredients are laid down in thin layers on a belt, moistened with the desired amount of water, and then consolidated by passing between pressure rolls.

The production of such asbestos-cement products generally necessitates the use of a low viscosity slurry of cement, fibre (asbestos) and water.

Cement products reinforced with fibres of organic polymers, steel, and with glass fibres, particularly alkali resistant glass fibres, are also known. Production of such reinforced cement products also generally necessitates the use of a low viscosity slurry of cement and water.

The present invention relates to production of a mouldable fibre-containing cementitious composition, which process is not dependent on the use of such a low viscosity slurry and in which a particular form of fibre is used.

Furthermore, the cement products produced from the mouldable cementitious composition have improved impact energy and fracture energy when compared with such products made from compositions which do not contain fibre, and when compared with, for example, known asbestos-cement products.

According to the present invention there is provided a process for the production of a mouldable fibre-containing cementitious composition by mixing a fibrous material with an aqueous cementitious composition comprising hydraulic cement and water, characterised in that at least one mat of a water-insoluble fibrous material is contacted with at least one surface of a shaped article of a mouldable cementitious composition and in that the cementitious composition comprises a homogeneous mixture of at least one hydraulic cement, water in a proportion of not more than 25% by weight of the hydraulic cement in the composition, and at least one water-soluble or water-dispersible polymeric material in a proportion of at least 1% by weight of the hydraulic cement in the composition.

In further embodiments of the invention there are provided a shaped article of a mouldable fibre-containing cementitious composition comprising a mouldable cementitious composition as hereinbefore described having at least one mat of a water-insoluble fibrous material in contact therewith, and a cement product produced by curing of a fibre-containing cementitious composition as herein-before described.

The mat of water-insoluble fibrous material will hereinafter be referred to as the fibrous mat.

In the process of the invention the cementitious composition which is used is in the form of a shaped article. For example, the composition may be in the form of a rod or tube and in particular it may be in a sheet-like form. Whether or not a cementitious composition can be produced in a mouldable, shaped form is controlled inter alia by the effectiveness of the mixing of the components of the cementitious composition, by the proportion of water in the composition, and by the nature of and the proportion of the water-soluble or water-dispersible polymeric material in the composition. The cementitious composition should be of a consistency such that it is mouldable and be capable of retaining its shape after moulding.

It is desirable that the components of the cementitious composition be thoroughly and homogeneously mixed, for example, by mixing under conditions of high shear. For example, the composition may be mixed in a planetary mixer or in a screw extruder. The composition may be mixed under reduced pressure, for example under vacuum, e.g. in an internal, high shear mixer. The composition is most preferably mixed under conditions of high shear on a twin-roll mill by passing the composition repeatedly through the nip between the rolls of the mill, this procedure producing a thoroughly well mixed sheet-like composition.

The proportion of water should be sufficiently high as to permit a mouldable shaped composition to be produced. In general, at least 5% of water by weight of hydraulic cement in the composition will be used. In order to produce a high strength cement product, in particular a product having a high flexural strength, it is desirable to use a low proportion of water, and for this reason it is desirable that the cementitious composition comprises not more than 20% of water by weight of the hydraulic cement in the composition.

The cementitious composition contains at least 1% by weight of a water-soluble or water-dispersible polymeric material which acts as a rheological aid in the production of a shaped mouldable composition. It may be desirable to use at least 3% by weight of such a polymeric material. In general it will not be necessary for the composition to comprise more than 15% of such a polymeric material by weight of the hydraulic cement in the composition.

Examples of suitable polymeric materials include (i) cellulose ethers, for example hydroxypropyl methyl cellulose, (ii) amide-substituted polymers, for example a polymer or copolymer of acrylamide, and (iii) polyalkylene oxide derivatives which may be for example a polyalkylene oxide (alternatively described as a polyalkylene glycol) for example polyalkylene glycols of molecular weight above about 10,000, or polyalkoxy derivatives of alcohols, phenols or the like.

The components of the cementitious composition, and the proportions thereof, should be chosen such that the cementitious composition may be thoroughly and homogeneously mixed to form a cohesive, mouldable composition which may be shaped into the desired form. For example the cementitious composition may be shaped into the form of a rod or tube or sheet by extruding the composition through a suitably shaped die, or it may be shaped into the form of a sheet by compounding the composition on a twin-roll mill, or it may be shaped by pressing in a suitably shaped mould.

The composition is preferably sufficiently cohesive that, for example, where a sheet is formed on a mill the sheet may be removed from the rolls of the mill in lengths of at least 30 cm. If the polymeric material is not sufficiently water-soluble or water-dispersible a continuous, cohesive, sheet may not be formed. Indeed the mixture may be friable. It is preferred to use a water-soluble polymeric material as such materials are generally particularly effective as rheological aids.

A particularly preferred water-soluble or water-dispersible polymeric material for use as a rheological aid is a hydrolysed vinyl ester polymer or copolymer, particularly a partially hydrolysed poly(vinyl acetate). The use of such polymeric materials may lead to the production of cement products having remarkably high flexural strengths, for example in excess of 100 MPa and even in excess of 150 MPa.

Compositions containing such preferred polymeric materials are described in European Patent Publication No. 0055035 in which there is described a cementitious composition comprising
 (a) at least one hydraulic cement,
 (b) water in a proportion of not more than 25% by weight of the composition, and
 (c) at least one water-soluble or water-dispersible organic polymer or copolymer in a proportion of 1 to 15% by weight of the hydraulic cement in the composition,
the hydraulic cement and the polymer or copolymer being selected such that a test composition comprising 100 parts by weight of hydraulic cement, 5 parts by weight of the polymer or copolymer, and 16 parts by weight of water, when extruded in a capillary rheometer, undergoes an increase of at least 25% in shear stress when a ten-fold increase in the shear rate of the cementitious composition is effected when the shear rates as measured are within the range 0.1 to 5 second$^{-1}$.

A capillary rheometer in which the test composition is extruded comprises a piston in a cylindrical barrel and a capillary orifice through which the test composition may be extruded.

The shear stress in kN cm$^{-2}$ is defined by $$\frac{Fd}{\pi L D^2}$$

and the shear rate in second$^{-1}$ by $$\frac{2vD^2}{15d^3}$$

where D is the diameter of the barrel of the rheometer in cm, v is the rate of travel of the piston in the barrel of the rheometer in cm min$^{-1}$, d is the diameter of the capillary of the rheometer in cm, L is the length of the capillary of the rheometer in cm, and F is the force in kN applied to the piston of the rheometer. In general, D will be in the range 1 to 3 cm, d in the range 0.2 to 0.5 cm, and L in the range 5d to 20d.

By application of the capillary rheometer test the nature of the components for use in the cementitious composition may be selected. In particular, application of the capillary rheometer test enables hydraulic cements and water-soluble or water-dispersible polymeric materials to be readily selected which in combination are suitable for use in cementitious compositions from which cement products having very high flexural strengths may be produced.

A particularly preferred water-soluble organic polymer or copolymer, which in combination with a calcium silicate cement of the Portland type or an aluminous cement, e.g. a calcium aluminate cement, satisfies the criteria of the capillary rheometer test, is a hydrolysed vinyl ester polymer or copolymer, particularly a hydrolysed vinyl acetate polymer or copolymer.

The degree of hydrolysis of the vinyl acetate (co)polymer has a bearing on whether or not the (co)polymer in combination with a hydraulic cement in the test composition satisfies the aforementioned criteria of the capillary rheometer test. In order that in the capillary rheometer test an increase of at least 25% in shear stress should be produced by the ten-fold increase in shear rate, it is preferred that the degree of hydrolysis of the vinyl acetate (co)polymer be at least 50%, and more preferably in the range 70% to 96%, that is it is preferred that at least 50%, and more preferably 70% to 96% of the vinyl acetate units in the polymer or copolymer are hydrolysed to the alcohol form. We have found that a test composition containing substantially fully hydrolysed vinyl acetate (co)polymer, e.g. more than 97% hydrolysed, does not satisfy the criteria of the capillary rheometer test. Indeed it is very difficult to produce a test composition which is extrudable in the capillary rheometer.

By the term "hydraulic cement" we mean any material which sets and hardens by the addition of water, and which thus sets and hardens in the presence of water. The hydraulic cement may be a silicate (siliceous) cement, for example Portland cement e.g. a calcium silicate cement. If desired it may be an aluminous cement, for example a calcium aluminate cement, or a calcium sulphate hemihydrate ("Plaster of Paris") cement. Mixtures of two or more different hydraulic cements may be used if desired.

In the process of the invention at least one fibrous mat is contacted with at least one surface of a mouldable shaped article of a cementitious composition as defined. A fibrous mat may be contacted with the surface of the shaped article of the cementitious composition. For example, a fibrous mat may be contacted with a cementitious composition in the form of a sheet. Where the composition is in the form of a rod or tube a mat in the form of a tape may be contacted with the composition by a tape winding process. Alternatively, the mat may be formed in situ by contacting the surface of the shaped article of the composition with filaments of the fibrous material in such a way as to form a mat. Thus, where the cementitious composition is in the form, for example, of a rod or tube, a fibrous mat may be formed in situ, for example, by a filament winding process.

The cementitious composition used in the process of the invention is of high viscosity, particularly when compared with a slurry of a hydraulic cement and water, and it has been found to be difficult to effect contact of random fibres with a surface of the mouldable shaped article of the cementitious composition in such a way that the fibres are evenly distributed. Furthermore, it is a surprising feature of the invention that the effect of incorporation of a fibrous mat on the impact energy and fracture energy of the cement product produced from the composition is much greater than is the effect on these latter properties of incorporation of the same proportion of random fibres which are not in the form of a mat.

In the process of the invention a fibrous mat is contacted with at least one surface of a shaped article of a mouldable cementitious composition in such a manner as at least to cause the mat to adhere to the surface of the composition. For example, the fibrous mat may be pressed onto a surface of the shaped article of the cementitious composition. Such a pressing step is most conveniently effected where the mouldable cementitious composition is in the form of a sheet. Preferably the fibrous mat is embedded in the cementitious composition. For example, a fibrous mat may be pressed into one surface of a shaped article, e.g. a sheet, of mouldable cementitious composition, or alternatively fibrous mats may be pressed into both surfaces of a mouldable sheet of cementitious composition. In alternative embodiments one or more fibrous mats may be pressed between two sheets of mouldable cementitious composition, or the process may be operated with more than two sheets of mouldable composition with one or more fibrous mats being pressed between each pair of adjacent sheets of mouldable composition to form a sandwich construction.

The contacting of the fibrous mat with the surface of the shaped article of the cementitious composition may be effected in a variety of different ways. For example, the fibrous mat may be lightly pressed in contact with the surface. Where it is desired to embed the fibrous mat in the composition such that the fibrous mat is penetrated by the cementitious composition, shaped articles, e.g. sheets, of mouldable cementitious composition and fibrous mat may be pressed together in a hydraulic press. Alternatively, sheets of mouldable cementitious composition and fibrous mat may be pressed by passing them through the nip between a pair of rotating rolls. In order to reduce the thickness of the resultant composition the composition may be passed through a nip of progressively decreasing size. In a preferred embodiment the process is operated by feeding through such a nip fibrous mat and sheets of mouldable cementitious composition each of which is carried by a separate rotating roller. Thus, the process may be operated in a continuous manner.

In the process of the present invention the fibrous material which is used in the form of, or is formed into, a coherent fibrous mat, and is not in the form of loose, random fibres.

The fibrous mat may be woven or non-woven, or a mixture of woven and non-woven fibrous mats may be used. The fibres in the mat may be evenly distributed, so as to form a regular pattern, or they may be randomly distributed in the mat.

In order to assist penetration of the fibrous mat by the mouldable cementitious composition, where this is desired, for example, in the aforementioned sandwich construction, it is preferred that the mat should comprise a substantial proportion of voidage. In particular it is preferred that the fibres in the mat should not be so close together that the mat acts as a filter for the cement particles in the cementitious composition thereby preventing the cement particles from penetrating the mat Thus, it is preferred that the pitch of the fibrous mat, that is the average distance between adjacent fibres, is greater than the size of the majority of the cement particles. Also, the fibre diameter will in general not be substantially greater than the average distance between adjacent fibres. It will be appreciated that the precise structure of mat, and in particular the proportion of voidage and the pitch, will depend inter alia on the size of the cement particles in the cementitious composition. Where the composition also contains particulate aggregate it is also preferred that the pitch of the fibrous mat is greater than the size of the majority of the particles of aggregate.

The fibrous mat may be of an inorganic material. For example, it may be a glass-fibre mat, particularly a mat of an alkali-resistant glass fibre. The mat may be of asbestos fibre, or of alumina or zirconia fibre. The mat may be of carbon fibre or of a metal fibre, e.g. a steel fibre.

If desired the mat may be a mixture of two or more different types of fibre, or two or more mats of different fibrous material may be used.

The fibrous mat may be of an organic material, particularly of an organic polymeric material. For example, the mat may be of polyolefin fibre, e.g. polyethylene or polypropylene; of fluorinated polyolefin, e.g. polyvinylidene fluoride or polytetrafluoroethylene; or polyamide fibre; or of polyester fibre, e.g. poly(ethylene terephthalate); or of cellulosic fibre.

The fibres in the mat may be multi-filament or monofilament.

It is preferred to use fibrous mats that are themselves flexible, and for this reason it is preferred to use relatively thin mats having a maximum thickness of the order of 1 mm, or even 0.5 mm, and to use mats made of relatively thin fibres, e.g. having a fibre diameter of no more than 1 mm.

In order that the presence of the fibrous mat should have a substantial effect on the properties of the cement product it is preferred that the composition should comprise an amount of fibrous mat such that in the fibre-containing cement product produced by curing of the composition there is present at least 0.5% of fibrous mat by volume of the fibre-containing cement product. In general the cement product will comprise at least 2% of fibrous mat by volume of the fibre-containing cement product, and in general not more than 20% of fibrous mat by volume of the fibre-containing cement product.

Proportions of fibrous mat outside the range of 0.5% to 20% by volume may be used.

In the process of the invention there is produced a shaped article of a mouldable cementitious composition containing one or more fibrous mats. Incorporation of the fibrous mat into the shaped mouldable cementitious composition should of course be effected at a stage at which the curing reaction of the hydraulic cement has not proceeded to an extent such that the composition is no longer mouldable and at which the composition can no longer adhere to the fibrous mat.

The product of the process of the invention is a shaped article of a cementitious composition containing a mat of fibrous material in contact with and adhered thereto and preferably embedded therein. This shaped article may itself be cured in the form in which it is produced, or alternatively, before curing the article may be further shaped, e.g. by pressing in a suitably shaped mould.

The fibre-containing mouldable cementitious composition of the invention, optionally after further shaping, may be cured to a fibre-reinforced cement product.

The curing of the cementitious composition of the invention may be achieved in conventional manner, for example, by maintaining the composition in a humid atmosphere, e.g. at a relative humidity at or near 100% for a period of 0.5 to 30 days, or curing may be achieved merely by allowing the composition to stand at ambient temperature and relative humidity. The time required to achieve curing is dependent at least in part on the temperature used, the higher the temperature the shorter the curing time required. Although curing may be effected at ambient temperature the time required may conveniently be reduced by using a curing temperature in the range, for example, 40° C. to 120° C.

The cementitious composition may be cured at elevated temperature and under a moderate applied pressure, e.g. of up to 5 MPa. It is preferred to cure the composition under such an applied moderate pressure, at least in the initial stages of the curing reaction such that after release of the pressure the composition does not undergo a significant dimensional change.

In order that the cement product should possess particularly high flexural strength it is preferred that not more than 2%, and more preferably not more than 0.5%, of the total volume of the cement matrix of the cement product comprises pores having a maximum dimension exceeding 100 microns, preferably 50 microns, and more preferably 15 microns, as measured by the method of quantitative microscopy described in the published European Patent Publication No. 0 021 682.

The cementitious composition of the invention, and the cement product produced therefrom, may contain particulate materials, for example, particulate aggregate, e.g. sand, silicon carbide, alumina. The aggregate is preferably of small particle size, e.g. less than 200 microns.

The cementitious composition may contain particulate materials for the purpose of obtaining specific properties in the cement product produced from the composition. For example, the composition may comprise magnetic or magnetisable materials, for example, iron, copper or graphite particles.

Where the cementitious composition contains such particulate material the composition should contain not more than 25% of water by weight of the total weight of hydraulic cement and particulate material in the composition, and at least one water-soluble or water-dispersible polymeric material in a proportion of at least 1% by weight of the total weight of hydraulic cement and particulate material in the composition.

The cement product may have a variety of different shapes depending on the particular method which is used to shape the fibre-containing composition. Shaping of the fibre-containing composition in a hydraulic press or on a twin-roll mill to produce a shaped article in the form of a sheet is readily effected, but the cement product may have shapes other than that of a sheet.

The cement product finds applications where impact resistance is desired in such a product, e.g. in building applications. The cement product may be resistant to impact by a projectile over a range of velocities of the projectile.

The cement product when struck by such a projectile may suffer only localised damage whereas a cement product which does not contain a mat of a fibrous material may shatter when struck by the same projectile.

The invention is now illustrated by the following examples in which, unless otherwise stated, all parts are expressed as parts by weight.

EXAMPLE 1

100 parts of a calcium aluminate cement (Secar 71) and 7 parts of 80% hydrolysed polyvinyl acetate (Gohsenol KH 17S) were dry mixed and the resultant mixture was added to 9.8 parts of water containing 0.7 parts of glycerol. The resultant composition was blended in a bladed high shear mixer and was then removed from the mixer in the form of a crumble and converted into a cohesive, continuous and homogeneous 2 mm thick sheet by passing the composition repeatedly through the nip of a twin-roll mill.

The sheet was then cut into approximately equal sized sections and a fibre-containing composition was formed by placing a non-woven glass fibre mat on a first section of the sheet, placing a second section of sheet on the glass fibre mat, placing a second glass fibre mat on the second section of sheet, and placing a third section of sheet on the second glass fibre mat, the thus formed composition having a total thickness of approximately 6 mm.

The fibre-containing composition was then pressed at a pressure of 5 MPa in a hydraulic press for 10 minutes at 80° C. and thereafter placed in an oven at 80° C. for 16 hours to produce a hardened fibre-reinforced cement product.

(The glass fibre mat was made of 340 decitex glass fibre and comprised 3 threads per cm in a first direction and 3 threads per cm in a direction at right angles to the first direction).

The fibre-reinforced cement product, which contained 1.9% by volume of glass fibre, had the following properties.

| | |
|---|---|
| Flexural strength | 146 ± 17 MPa |
| Flexural modulus | 45 ± 3 GPa |
| Fracture energy | 3.5 ± 0.5 KJm$^{-2}$ |
| Impact energy | 9.2 ± 1.5 KJm$^{-2}$ |

Flexural strength and modulus were measured in a 3-point bend test.

The fracture energy was determined by fracturing a notched beam in centre point bending on an Instron testing machine. The area under the load-deflection curve was then divided by the nominal cross-sectional area of the fracture surface.

The impact energy was measured on a Zwick impact tester on unnotched samples.

By way of comparison the properties of a cement product which did not contain glass fibre mat and which was prepared following the above-described mixing, heating and pressing procedure were

| | |
|---|---|
| Flexural strength | 150 MPa |
| Flexural modulus | 50 GPa |
| Fracture energy | 0.4 KJm$^{-2}$ |
| Impact energy | 3.0 KJm$^{-2}$ |

By way of further comparison fibre-containing cement products were produced except that in each case random fibres were used.

1. The above procedure was repeated except that the non-woven glass fibre mat was replaced by 4 cm long staple carbon fibres, the carbon fibres being randomly distributed between adjacent sheets of the cement composition, and the resultant fibre-containing composition was passed through the nip between the rolls of a twin-roll mill prior to pressing in a hydraulic press and heating.

The fibre-conaining cement product, which contained 2% by volume of carbon fibre, had the following properties.

| | |
|---|---|
| Flexural strength | 110.05 ± 16.8 MPa |
| Flexural modulus | 41.02 ± 5.2 GPa |
| Fracture energy | 0.5 KJm$^{-2}$ |
| Impact energy | 3.2 ± 1.03 KJm$^{-2}$ |

2. The above procedure was repeated except that the non-woven glass fibre mat was replaced by chopped glass fibre, the glass fibre being randomly distributed between adjacent sheets of the cement composition. The fibre-containing cement composition was cured to a cement product. The product had unsatisfactory properties in that the randomly distributed glass fibres, which were present in the product in a proportion of 2% by volume, tended to prevent adjacent sheets of cement composition adhering to each other.

3. A cement composition as used above, except that the composition contained 17 parts of water, was charged to a screw extruder together with chopped glass fibre and the fibre-containing composition was extruded into the form of a rod, and the rod was placed in an oven at 80° C. for 16 hours in order to produce a hardened fibre-containing cement product.

The cement product containing 10% by volume of glass fibre had the following properties.

| | |
|---|---|
| Flexural strength | 72.96 ± 6.87 MPa |
| Flexural modulus | 37.19 ± 0.84 GPa |
| Fracture energy | 0.5 KJm$^{-2}$ |
| Impact energy | 3 KJm$^{-2}$ |

By way of comparison a commercially available asbestos-cement product in a highly compressed form (Syndanio) and containing about 50% by volume of fibre had the following properties.

| | |
|---|---|
| Flexural strength | 48.8 ± 0.8 MPa |
| Flexural modulus | 16.9 ± 0.3 GPa |
| Fracture energy | 2 ± 0.3 KJm$^{-2}$ |
| Impact energy | 5 KJm$^{-2}$ |

EXAMPLE 2

The procedure of example 1 was repeated to produced a fibre-containing composition and a cement product therefrom, except that the cement product contained 3.4% by volume of fibre, and the composition was made from 6 sheet sections of cementitious composition and 5 layers of glass fibre mat.

The properties of the cement product were as follows:

| | |
|---|---|
| Flexural strength | 124 ± 8 MPa |
| Flexural modulus | 43 ± 1 GPa |
| Fracture energy | 2.62 ± 0.55 KJm$^{-2}$ |
| Impact energy | 13.4 ± 2.7 KJm$^{-2}$ |

EXAMPLE 3

The procedure of Example 1 was repeated except that in place of the glass fibre mat there was used a woven nylon fibre mat of 1270 decitex fibre having 7.1 threads per cm in a first direction and 6.7 threads per cm in a direction at right angles thereto. The fibre-containing cement product contained 5.4% by volume of nylon fibre and the cement product had the following properties.

| | |
|---|---|
| Flexural strength | 120 ± 2.7 MPa |
| Flexural modulus | 47 ± 1.2 GPa |
| Fracture energy | 15.9 ± 3.0 KJm$^{-2}$ |
| Impact energy | 38 ± 7.7 KJm$^{-2}$ |

EXAMPLE 4

The procedure of Example 3 was repeated except that the woven nylon mat comprised 360 decitex fibre and 12.6 threads per cm in a first direction and 12.6 threads per cm in a direction at right angles thereto. The fibre-containing cement product contained 5.4% by volume of fibre.

The cement product had the following properties.

| | |
|---|---|
| Flexural strength | 128 ± 8.2 MPa |
| Flexural modulus | 48 ± 1.8 GPa |
| Fracture energy | 9.17 ± 0.84 KJm$^{-2}$ |
| Impact energy | 25.5 ± 3.8 KJm$^{-2}$ |

EXAMPLE 5

The procedure of Example 1 was repeated except that the cementitious composition had the following composition
 100 parts ordinary Portland Cement (Snowcrete)
 5 parts hydroxy propyl methyl cellulose
 15 parts water
the fibrous mat which was used comprised sheets of a woven steel mesh having a hole size of about 1 mm, and curing was effected by pressing the composition at ambient temperature and 3 MPa for 48 hours followed by curing for 7 days at 100% relative humidity.

The fibre-reinforced cement product which contained 3% by volume of fibre had the following properties

| | |
|---|---|
| Flexural strength | 55.07 ± 8.2 MPa |
| Flexural modulus | 39.24 ± 5.5 GPa |
| Fracture energy | 33.99 ± 8.9 KJm$^{-2}$ |
| Impact energy | 13.29 ± 2.4 KJm$^2$ |

EXAMPLES 6 TO 8

In three separate examples the procedure of Example 4 was repeated except that the number of sheets of cement composition and of nylon fibre mat were varied.

EXAMPLE 6

Five sheets of cement composition and four nylon fibre mats were used.

The cement product, which contained 8.8% by volume of fibre, had the following properties.

| | |
|---|---|
| Flexural strength | 98.15 ± 4 MPa |
| Flexural modulus | 36.7 ± 1 GPa |
| Fracture energy | 18.0 ± 2 KJm$^{-2}$ |

EXAMPLE 7

Nine sheets of cement composition and eight nylon fibre mats were used.

The cement product, which contained 11.0% by volume of fibre, had the following properties.

| | |
|---|---|
| Flexural strength | 63.45 ± 4 MPa |
| Flexural modulus | 31.1 ± 0.2 GPa |
| Fracture energy | 37.9 ± 1.5 KJm$^{-2}$ |
| Impact energy | 91.7 ± 32 KJm$^{-2}$ |

EXAMPLE 8

Twelve sheets of cement composition and eleven nylon fibre mats were used.

The cement product, which contained 15% by volume of fibre, had the following properties.

| | |
|---|---|
| Flexural strength | 54.1 ± 2.8 MPa |
| Flexural modulus | 30 GPa |
| Fracture energy | 44.3 ± 12 KJm$^{-2}$ |
| Impact energy | 121.2 ± 17 KJm$^{-2}$ |

EXAMPLES 9 AND 10

The procedure of Example 1 was repeated except that in place of the glass fibre mat there was used a woven polyamide fibre mat of 1000 denier fibre (Kevlar, E. I. Du Pont de Nemours Inc.), and in Example 9 thirteen sheets of cement composition and twelve fibre mats were used, the fibre being present in the cement product in a proportion of 9% by volume, and in Example 10 three sheets of cement composition and two fibre mats were used, the fibre being present in the cement product in a proportion of 4.2% by volume.

The properties of the cement products were as follows.

| | Example 9 | Example 10 |
|---|---|---|
| Flexural strength | 94.25 ± 6.8 MPa | 128.33 ± 6.4 MPa |
| Flexural modulus | 37.4 ± 1.4 GPa | 52.8 ± 6.72 GPa |
| Fracture energy | 78.6 ± 2.8 KJm$^{-2}$ | 21.32 ± 3.2 KJ$^{-2}$ |
| Impact energy | 88.6 KJm$^{-2}$ | |

I claim:

1. A process for the production of a mouldable fibre-containing cementitious composition by mixing a fibrous material with an aqueous cementitious composition comprising hydraulic cement and water, wherein at least one mat of a water-insoluble fibrous material is contacted with at least one surface of a shaped article of a mouldable cementitious composition and in that the cementitious composition comprises a homogeneous mixture of at least one hydraulic cement, water in a proportion of not more than 25% by weight of the hydraulic cement in the composition, and at least one water-soluble or water-dispersible polymeric material in a proportion of at least 1% by weight of the hydraulic cement in the composition.

2. A process as claimed in claim 1 characterised in that the shaped article of a mouldable cementitious composition is in the form of a sheet.

3. A process as claimed in claim 1 or claim 2 characterised in that the cementitious composition comprises at least 5% of water by weight of the hydraulic cement in the composition.

4. A process as claimed in claim 1 characterised in that the cementitious composition comprises not more than 20% of water by weight of the hydraulic cement in the composition.

5. A process as claimed in claim 1 characterised in that the cementitious composition comprises 3% to 15% of water-soluble or water-dispersible polymeric material by weight of the hydraulic cement in the composition.

6. A process as claimed in claim 1 characterised in that the water-soluble or water-dispersible polymeric material comprises hydroxypropyl methyl cellulose.

7. A process as claimed in claim 1 characterised in that the water-soluble or water-dispersible polymeric material comprises partially hydrolysed polyvinyl acetate.

8. A process as claimed in claim 1 characterised in that the hydraulic cement is selected from a calcium silicate cement and a calcium aluminate cement.

9. A process as claimed in claim 1 characterised in that a mat of fibrous material is pressed into at least one surface of a shaped article of a mouldable cementitious composition.

10. A process as claimed in claim 1 characterised in that one or more mats of fibrous material are pressed between two sheets of mouldable cementitious composition.

11. A process as claimed in claim 1 characterised in that more than two sheets of mouldable cementitious composition are used and one or more mats of fibrous material are pressed between each adjacent pair of sheets of mouldable cementitious composition.

12. A process as claimed in claim 1 characterised in that contact between the shaped article of a mouldable cementitious composition and the mat of fibrous material is effected in a hydraulic press.

13. A process as claimed in claim 1 characterised in that one or more sheets of mouldable cementitious composition and one or more mats of fibrous material are passed through the nip between a pair of rotating rolls.

14. A process as claimed in claim 1 characterised in that the mat of fibrous material is a woven mat.

15. A process as claimed in claim 1 characterised in that the fibrous material is selected from glass fibre, steel fibre and a polyamide fibre.

16. A process as claimed in claim 1 characterised in that the mat of fibrous material is used in a proportion such that in a cement product produced by curing of the cementitious composition there is present 0.5% to 20% of mat by volume of the fibre-containing cement product.

17. A process as claimed in claim 1 characterised in that the cementitious composition comprises at least one particulate material, and in that there is present in the composition not more than 25% of water by weight of the total weight of the hydraulic cement and particulate material in the composition, and at least 1% of water-soluble or water-dispersible polymeric material by weight of the total weight of the hydraulic cement and particulate material in the composition.

18. A shaped article of a mouldable fibre-containing cementitious composition wherein the cementitious composition is a homogeneous mixture of at least one hydraulic cement, water in a proportion of not more than 25% by weight of the hydraulic cement in the composition, and at least one water-soluble or water-dispersible polymeric material in a proportion of at least 1% by weight of the hydraulic cement in the composition, and in that at least one mat of a water-insoluble fibrous material is in contact with the shaped article.

19. A shaped article as claimed in claim 18 characterised in that the shaped article of a mouldable cementitious composition is in the form of a sheet.

20. A shaped article as claimed in claim 18 or claim 19 characterised in that the cementitious composition comprises at least 5% of water by weight of the hydraulic cement in the composition.

21. A shaped article as claimed in claim 18 characterised in that the cementitious composition comprises not more than 20% of water by weight of the hydraulic cement in the composition.

22. A shaped article as claimed in claim 18 characterised in that the cementitious composition comprises 3% to 15% of water-soluble or water-dispersible polymeric material by weight of the hydraulic cement in the composition.

23. A shaped article as claimed in claim 18 characterised in that the water-soluble or water-dispersible polymeric material comprises hydroxypropyl methyl cellulose.

24. A shaped article as claimed in claim 18 characterised in that the water-soluble or water-dispersible polymeric material comprises partially hydrolysed polyvinyl acetate.

25. A shaped article as claimed in claim 18 characterised in that the hydraulic cement is selected from a calcium silicate cement and a calcium aluminate cement.

26. A shaped article as claimed in claim 18 characterised in that a mat of fibrous material is embedded in at least one surface of a shaped article of a mouldable cementitious composition.

27. A shaped article as claimed in claim 18 characterised in that one or more mats of fibrous material are sandwiched between two sheets of mouldable cementitious compositions.

28. A shaped article as claimed in claim 18 characterised in that the article contains more than two sheets of mouldable cementitious composition and in that one or more mats of fibrous material are sandwiched between each adjacent pair of sheets of mouldable cementitious composition.

29. A shaped article as claimed in claim 18 characterised in that the mat of fibrous material is a woven mat.

30. A shaped article as claimed in claim 18 characterised in that the fibrous material is selected from glass fibre, steel fibre and a polyamide fibre.

31. A shaped article as claimed in claim 18 characterised in that the mat of fibrous material is present in a proportion such that in a cement product produced by curing of the cementitious composition there is present 0.5% to 20% of mat by volume of the fibre-containing cement product.

32. A shaped article as claimed in claim 18 characterised in that the cementitious composition comprises at least one particulate material, and in that there is present in the composition not more than 25% of water by weight of the total weight of the hydraulic cement and particulate material in the composition, and at least 1% of water-soluble or water-dispersible polymeric material by weight of the total weight of the hydraulic cement and particulate material in the composition.

33. A fibre-containing cement product characterised in that the product is produced by curing of a shaped article of a cementitious composition containing a mat of a water-insoluble fibrous material as claimed in claim 18.

* * * * *